United States Patent Office 2,892,805
Patented June 30, 1959

2,892,805
VULCANIZING FURNACE BLACK STOCKS WITH DITHIO SECONDARY AMINES

Andrew Tomlin, Hudson, Ohio, and Marion W. Harman, Richard O. Zerbe, and Robert L. Sibley, Nitro, W. Va., assignors to Monsanto Chemical Company, St. Louis, Mo., a corporation of Delaware No Drawing. Application April 1, 1955
Serial No. 498,774

3 Claims. (Cl. 260—41.5)

The present invention relates to the vulcanization of a rubber. More particularly this invention relates to a process of vulcanizing a rubber stock whereby prevulcanization or scorch is substantially eliminated and to the vulcanized rubber products so obtained. A specific object is to provide a method for safely processing rubber stocks containing a furnace black. Another object is to provide a method of compounding which produces vulcanizates having improved properties. These and other objects are hereinafter elaborated.

Furnace blacks which possess reinforcing properties similar to channel blacks are finding increasing acceptance. however, the extensive replacement of channel blacks by reinforcing type furnace blacks has brought with it several troublesome problems, the most serious of which is the tendency of furnace black stocks to scorch. Even with the safest of the delayed action type accelerators this shortcoming continues to exist. Replacement of all or part of the sulfur with organic vulcanizing agents such as xanthogen sulfides, amine polysulfides, phenol sulfides and thiuram sulfides actually lowered the processing safety even in the case of N,N'-tetrathio-bis-morpholine, known to be a scorch inhibitor as well as a powerful vulcanizing agent in gum and channel black stocks. Certain organic acids have the property of retarding cure and a variety of these cure retarders are available but the furnace black stocks do not respond to this treatment. Thus, retardation of cure in a gum or channel black stock is no criteria that noticeable retardation of cure will take place in a similarly compounded furnace black stock.

It was found that use of certain N,N'-dithio-bis-secondary amines as the essential vulcanizing agent for furnace black stocks in conjunction with delayed action thiazole accelerators, preferably thiazolesulfenamides, provided an adequate margin of processing safety. This compounding practice was described in co-pending application Serial No. 187,701, filed September 29, 1950 of which the present application is a continuation-in-part. While the cured compounds possessed excellent age resistance and aged flex resistance, the unaged stocks cracked under repeated stress. After a few thousand miles pneumatic tires contained radial and tread cracks. However, it has now been discovered that this flex cracking can be presented by treating the compound with certain antidegradation agents. In general any of the nitrogen containing rubber antioxidants are beneficial although the improvement varies considerably depending upon the particular antidegradation agent or mixture used.

The cracking may result from residual vulcanizing material which migrates to the surface and then decomposes to accelerate free radical degradation processes. A laboratory test for cracking comprises cutting a small slit in the stock and observing the rate of cut growth under repeated stress. Painting N,N'-dithio-bis-morpholine on the surface of a stock cured with 2.5 parts sulfur or 0.8 part sulfur and 1.5 parts N,N'-dithio-bis-morpholine accelerated cut growth 23–54%. On the other hand, painting 6-ethoxy-1,2-dihydro-2,2,4-trimethylquinoline on the surface of a stock cured with 3.5 parts N,N'-dithio-bis-morpholine increased the resistance to cut growth 40–50%.

Examples of nitrogenous antidegradation agents which inhibit cracking are listed below. At least about 1.0% on the rubber is required. The compounds are roughly in the order of their effectiveness: 6-methoxy and 6-ethoxy-1,2-dihydro-2,2,4-trimethylquinoline, N-hexyl- and N-cyclohexyl-N'-phenyl-p-phenylenediamine and di(p-ethoxyphenyl)-p-phenylenediamine, but preferably sulfur derivatives thereof as hereinafter elaborated. Other compounds very effective are 4-anilino-carbanilide and 4-anilino 2-phenyl carbanilide.

Where desired a small amount of elemental sulfur may be used along with the dithioamine but the amount must remain considerably below that required for proper vulcanization otherwise processing safety will be inadequate. In general no more than 1.0% sulfur based on the rubber should be used and then supplemented with dithioamine. Thus, using the dithioamine as the essential vulcanizing agent means that the stock is compounded so that the dithioamine is essential for proper vulcanization.

In stocks containing furnace black dithioamines alone are sufficient for good cures. Zinc oxide improves the vulcanizates and delayed action thiazole accelerators improve them still more. In conventional sulfur cures omission of zinc oxide results in very poor physical properties.

The dithioamines suitable for use in the process of the invention are derivatives of secondary amines which are aliphatic in nature. These include dialkylamines and di(substituted alkyl) amines. The aliphatic chain may be only one carbon atom in length and substituents such as phenyl, tolyl, xylyl, naphthyl, furyl, chloro and cyano may be present. Since carbocyclic compounds in which the carbons are completely hydrogenated possess the properties of aliphatic radicals, derivatives of dialicyclic amines are also suitable although these are probably the least desirable group, better results being obtained when only one alicyclic group is present. Any combination of alkyl, substituted alkyl and alicyclic group is possible.

Finally, the dithio derivatives of six-membered heterocyclic rings are extremely useful in furnace black stocks.

Dithioamines may be prepared in known manner by reaction of two moles of the amine with one mole of a sulfur monohalide. Several procedures are described in the literature for carrying out this condensation. Amines containing substituents besides a secondary amino substituent which react with sulfur halide are not suitable starting materials.

Typical examples of dithioamines suitable for use in the invention comprise N,N'-dithio-bis-dimethylamine, N,N' - dithio-bis-diethylamine, N,N'-dithio-bis-dipropylamine, N,N'-dithio-bis-diisopropylamine, N,N'-dithio-bis-dibutylamine, N,N'-dithio-bis-diisobutylamine, N,N'-dithio - bis - diamylamine, N,N'-dithio-bis-dihexylamine, N,N'-dithio-bis-diheptylamine, and N,N'-dithio-bis-dioctylamine. Even higher groups such as nonyl, decyl, undecyl and dodecyl may be present but the molecular weight becomes so high that the limits of practical dosage are exceeded. Still further examples are N,N'-dithio-bis-dicyclohexylamine, N,N' - dithio - bis-ditetrahydrofurylamine, N,N'-dithio-bis-ditetrahydrothienylamine, N,N'-dithio - bis - di-beta-cyanoethylamine, N,N'-dithio-bis-di-beta-chlorethylamine, N,N'- dithio-bis-di-beta-phenethylamine, N,N'-dithio-bis-dibenzylamine, N,N'-dithio-bis-di-tetrahydrofurfurylamine, N,N'-dithio-bis-N-methylcyclohexylamine, N,N' - dithio - bis-N-ethylcyclohexylamine, N,N'-dithio-bis-N-isopropylcyclohexylamine, N,N'-dithio-bis-methylaminoacetonitrile, N,N'-dithio-bis-ethylaminoacetonitrile, N,N' - dithio - bis - propylaminoacetonitrile, N,N'-dithio-bis-butyl-aminoacetonitrile, N,N'-dithio-bis-methylaminopropionitrile, N,N'-dithio-bis-ethylaminopropionitrile, N,N' - dithio-bis-isopropyl-aminopropionitrile, N,N'-dithio-bis-butylaminopropionitrile, N,N'-dithio-bis-amylaminopropionitrile, N,N'-dithio-bis-octylaminopropionitrile, N,N' - dithio - bis-octadecylaminopropionitrile, N,N'-dithio-bis-N-methyltetrahydrofurfurylamine, N,N'-dithio - bis-N-ethyltetrahydrofurfurylamine, N,N'-dithio-bis-isopropyltetrahydrofurfurylamine, N,N'-dithio-bis-N-isobutyltetrahydrofurfurylamine, N,N'-dithio-bis-N-cyclohexyltetrahydrofurfurylamine, N,N'- dithio-bis-cyclohexylaminoacetonitrile, N,N'- dithio-bis-cyclohexylaminopropionitrile, N,N'-dithio-bis-tetrahydrofurylaminopropionitrile, N,N'-dithio-bis-piperidine, N,N'-dithio-bis-alpha-pipecoline and N,N'-dithio-bis-morpholine.

The term reinforcing furnace black is used in a broad sense to mean furnace blacks which are more reinforcing than mere diluents and includes the products commonly known as semireinforcing furnace blacks, as for example Pelletex, as well as those having greater reinforcing properties. These latter which may be called high reinforcing furnace blacks are variously referred to in the trade as fine furnace black, high modulus furnace black, medium abrasion furnace black, high abrasion furnace black and reinforcing furnace black. They are known under a variety of trade names, some of which are Sterling L, Sterling 80, Sterling 105, Philblack O, Philblack A, Statex K, Statex R, Statex 93, Kosmos 60, Vulcan-1, Vulcan-3, Continex HMF, Modulex, and Aromex. The furnace blacks are characterized by the property of activating the cure in contrast to the channel blacks which retard cure. While it is next to impossible to scorch a pure gum compound at 250° F. containing 2.5 parts sulfur based on the rubber content and accelerated with 0.5 part N-cyclohexyl-2-benzothiazole sulfenamide, the addition of 20 parts by weight of high reinforcing furnace black gave a stock having a decided tendency to scorch considerably below curing temperature. Increasing the proportion of black increased the tendency to scorch still more at least up to 50 parts by weight. In general 20–80 parts by weight on the rubber of furnace black cover the usual compounding practice but even lower proportions induce definite scorching tendencies.

Of course the amount of dithioamine which is used in a particular instance depends upon the stock and the type properties sought. In general 0.5 to 10% on the rubber covers the useful range. The optimum amount is a function of the molecular weight of the dithioamine so it is convenient to relate the sulfur content of the molecule to the compounding practice and excellent results have been obtained in amounts representing 0.5 to 1.5% sulfur on the rubber content. It should be appreciated that the vulcanizing action of these agents is in excess of that which can be explained on the basis of the sulfur content so it is probable that the residue of the molecule is also an effective cross-linking agent as is sulfur although the invention is not limited to any theory of the mode of action of the ingredients.

The dithioamines of this invention possess the unusual property of imparting slower cure and less scorch as the quantity is increased although the ultimate properties of the vulcanized rubber are up to a certain point improved. This is illustrated by a comparison of the scorch time and the 300% modulus figures of the 15 minute cures of stocks containing varying amounts of an N,N'-dithioamine. The base stock was composed of

| | Parts by weight |
|---|---|
| Smoked sheets rubber | 100.0 |
| Zinc oxide | 5.0 |
| Stearic acid | 2.0 |
| Philblack O | 50.0 |
| Hydrocarbon softener | 3.0 |
| Antioxidant | 1.0 |
| N-cyclohexyl-2-benzothiazole sulfenamide | 0.8 |

The stocks were cured at 292° F. The scorch data were obtained with a Mooney plastometer, the end point being taken at the time the plasticity curve began to rise sharply.

| Material Added to Base Stock | Amt. | Mooney Scorch at 250° F., mins. | 15 Min. Cure, 300% Modulus, lbs./in.$^2$ |
|---|---|---|---|
| Sulfur | 2.25 | 8 | 2,225 |
| N,N'-Dithio-bis-morpholine | 2.75 | 31 | 1,270 |
| Do | 4.60 | 32 | 667 |
| Do | 6.45 | 34 | 301 |
| Do | 8.30 | 36 | 145 |
| | | Scorch at 275° F. | |
| Sulfur | 2.50 | 7 | 2,403 |
| N,N'-Dithio-bis-diisopropylamine | 2.70 | 16 | 495 |
| Do | 7.20 | 20 | 155 |

Further examples of the invention are illustrated by employing the various dithioamines as curatives for a base stock composed of

| | Parts by weight |
|---|---|
| Smoked sheets rubber | 100.0 |
| Philback O | 50.0 |
| Hydrocarbon softener | 3.0 |
| Zinc oxide | 5.0 |
| Stearic acid | 2.0 |
| Antioxidant | 1.5 |
| N-Cyclohexyl-2-benzothiazole sulfenamide | 0.8 |

The stocks so compounded were cured in the usual manner at 292° F. The physical properties of the 45 minute cures are shown below to illustrate the characteristics of the vulcanizates and in addition the scorch times of the uncured stocks compared to a sulfur control. The Mooney plastometer was again employed to measure scorch.

| Material Added to Base Stock | Parts by wt. | Mooney Scorch at 275° F., mins. | Modulus of Elasticity in lbs./in.² at 300% Elongation | Ult. tensile in lbs./in.² | Ult. Elong, Percent |
|---|---|---|---|---|---|
| Sulfur | 2.5 | 7 | 2,383 | 3,763 | 450 |
| N,N'-Dithio-bis-piperidine | 3.7 | 18 | 2,550 | 3,673 | 426 |
| N,N'-Dithio-bis-pipecoline | 4.1 | 18 | 2,403 | 3,943 | 480 |
| N,N'-Dithio-bis-N-n-butyltetrahydrofurfurylamine | 5.9 | 17 | 2,240 | 4,070 | 520 |
| N,N'-Dithio-bis-diethylamine | 3.3 | 16 | 2,346 | 4,063 | 510 |
| N,N'-Dithio-bis-dioctylamine | 8.3 | 20 | 1,470 | 3,623 | 583 |
| N,N'-Dithio-bis-morpholine | 3.5 | 24 | 2,460 | 3,906 | 480 |
| N,N'-Dithio-bis-beta-ethyl-amino-propionitrile | 3.5 | 22 | 1,893 | 3,846 | 533 |
| N,N'-Dithio-bis-beta-n-butylamino-propionitrile | 4.9 | 30 none | 2,020 | 3,840 | 500 |
| N,N'-Dithio-bis-beta-cyclohexylamino-propionitrile | 3.5 | 29 | 1,926 | 3,966 | 563 |
| N,N'-Dithio-bis-cyclohexyl-amino-acetonitrile | 5.4 | 19 | 1,000 | 2,970 | 640 |
| N,N'-Dithio-bis-n-butyl-amino-acetonitrile | 4.5 | 14 | 870 | 2,906 | 636 |
| N,N'-Dithio-bis-isopropyl-amino-propionitrile | 4.6 | 20 | 2,293 | 3,746 | 456 |
| N,N'-Dithio-bis-N-cyclohexyltetrahydrofurfurylamine | 6.67 | 18 | 1,965 | 3,793 | 500 |
| N,N'-Dithio-bis-di-isopropylamine | 3.6 | 13 | 2,180 | 4,090 | 520 |

Compared to a cure with elemental sulfur and the delayed action accelerator N-cyclohexyl-2-benzothiazole sulfenamide, replacing of the sulfur by an N,N'-dithioamine vulcanizing agent increases processing safety even in the presence of an accelerator having a low critical temperature. While these data illustrate the remarkable efficiency of the dithioamines in the presence of another accelerator, adequate processing safety requires a delayed action accelerator. The dithioamines are accelerators as well as vulcanizing agents and high modulus and tensile properties are attainable without another accelerator. On the other hand, the thiazole accelerator is necessary for a stable vulcanizate having good abrasion resistance and resistance to flex cracking.

As illustrative of the resistance to cracking base stocks A, B and C were compounded as follows:

|  | A | B | C |
|---|---|---|---|
|  | Parts by weight | | |
| Smoked sheets rubber | 100.0 | 100.0 | 100.0 |
| Vulcan-3 | 50.0 | 50.0 | 50.0 |
| Zinc oxide | 5.0 | 5.0 | 5.0 |
| Stearic acid | 2.0 | 2.0 | 2.0 |
| Hydrocarbon softener | 3.0 | 3.0 | 3.0 |
| N-Cyclohexyl-2-benzothiazolesulfenamide | 0.5 | 0.5 | 0.5 |
| Sulfur | 2.5 |  | 0.8 |
| N,N'-Dithio-bis-morpholine |  | 3.5 | 1.5 |

Other stocks were compounded by adding to bases B and C antidegradation agents containing nitrogen identified in the table below. The stocks were cured in the usual manner in a press and the flex cracking resistance of the vulcanized products determined on an India flexing machine (Torrance and Peterson, India Rubber World, 80, 62 (1929)). In the center of a standard India flexing specimen a 0.12 inch slit was cut and the specimen flexed on the machine at 212° F. until the slit had progressed all the way across the specimen. The number of kilocycles before failure was recorded. In the table below these data have been converted to relative values by arbitrarily assigning the base stock A a value of 100 and calculating the relative flexing of the other stocks. The result has been designated the "flexing ratio." The large deficiency in flexing properties of the stock vulcanized with an N-thioamine has been overcome by addition of the antidegradation agents containing nitrogen.

*Table*

| Base | Material Added to Base | Flexing Ratio |
|---|---|---|
| A | None | 100 |
| B | do | 55 |
| B | 1.5 6-Ethoxy-1,2-dihydro-2,2,4-trimethyl-quinoline. | 100 |
| B | 1.5 N-Cyclohexyl-N'-phenyl-p-phenylenediamine. | 110 |
| B | 1.5 N-Hexyl-N'-phenyl-p-phenylenediamine | 118 |
| C | 1.5 Mixture of 85% 6-phenyl-1,2-dihydro-2,2,4-trimethylquinoline and 15% diphenyl-p-phenylenediamine. | 105 |

In a GR-S (butadiene-styrene copolymer) cold rubber stock good cure was obtained with 2 parts of N-cyclohexyl-2-benzothiazole sulfenamide and 1.5 parts of N,N'-dithio-bis-morpholine in 60 minutes at 292° F. However, the 300% modulus figures were doubled with 3.5 parts of the dithioamine and 1.0 part of the accelerator, exceeding by 50% the modulus of a stock containing 1.75 parts sulfur and 1.0 part accelerator. Additionally, the latter stock showed scorch in less than 30 minutes at 275° F. determined with a Mooney plastometer whereas the other stocks showed no scorch whatsoever in this time.

The increase in flexing obtained by incorporating an antidegradation agent into GR-S and vulcanizing with a dithioamine is greater than with natural rubber although the absolute values for the flexing are lower. The order of magnitude of the flexings before failure is several hundred kilocycles for a conventional natural rubber stock whereas a GR-S stock will fail at less than one hundred kilocycles under the same conditions.

Although the invention has been illustrated by numerous specific embodiments, it is not limited thereto. The principles described may be employed to advantage for compounding other types of sulfur vulcanizable rubbers. These rubbers comprise principally diene polymers as for example, polybutadiene, butadiene-styrene copolymer rubber, butadiene-acrylonitrile copolymer rubber and natural rubber. Similarly other accelerators than those selected to illustrate the invention may be used although the use of ultra and semi-ultra accelerators is not contemplated. Delayed action accelerators are critical for factory processing with short mixing cycles which inherently requires high processing temperature.

Mercapto thiazole accelerators in which the hydrogen of the mercapto group is replaced by an organic radical either by conversion to a disulfide or by introducing another organic radical into the molecule are, as is well known, much safer processing than the mercapto thiazoles and are available under their trade names. Examples are delayed action thiazole sulfenamides, as for example N,N-diethyl-2-benzothiazole sulfenamide, N,N'-diisopropyl-2-benzothiazole sulfenamide, N-tertiary-butyl-2-benzothiazole sulfenamide and 2-morpholinothiobenzothiazole.

The advantages of the invention are not confined to furnace black stocks although that is the chief technical problem solved. Stock temperatures as high as 300–325° F. in the presence of curatives during processing are commonplace and temperatures as high as 350° F. are even encountered for short periods. A natural rubber tread stock carrying 50 parts EPG (channel) black, 3 parts sulfur and 0.75 part N-cyclohexyl-2-benzothiazole sulfenamide will show a Mooney scorch at 250° F. within 30 minutes. Thus, the figures varied from 18 to 28 minutes whereas reducing the sulfur to 1 part or less and adding N,N'-dithio-bis-morpholine as the essential vulcanizing agent prolonged the scorch reading by nearly 50%.

The corresponding N,N'-thiobis amines possess vulcanizing activity and resemble the dithioamines in resistance to prevulcanization in rubber compounds containing furnace carbon black. They are less effective vulcanizing agents and therefore the dithioamines are preferred.

Rubber vulcanized with an N,N'-dithiobis amine and treated with an antidegradation agent containing both nitrogen and sulfur resists flex cracking to a surprising degree. For example, neither phenyl-beta-naphthylamine nor diphenyl-p-phenylenediamine are satisfactory although small amounts of the latter enhance the activity of other nitrogenous antidegradation agents. On the other hand, the sulfur derivatives are much better. Such products are obtainable by reaction with sulfur or a sulfur halide. These products which comprise phenthiazine, naphththiazine, the reaction product of sulfur and p-ethoxy phenyl-beta-naphthylamine and others are described in U.S. Patent No. 1,809,798 to Clifford; U.S. Patents Nos. 1,940,816 and 2,035,620 to Semon and U.S. Patent No. 2,024,477 to Scott. The sulfur derivatives of diaryl-p-phenylenediamines are described in U.S. Patent No. 2,187,155 to Ingram. Similarly, the sulfur derivatives of 1,2-dihydro-2,2,4-trimethylquinolines are described in U.S. Patent No. 2,001,071 to Sibley although at that time the ketone amine reaction products were not definitely known to be dihydroquinolines. The sulfur derivative of 6-ethoxy-1,2-dihydro-2,2,4-trimethylquinoline (reaction product of p-phenetidine and acetone) increases the flex cracking resistance of a dithioamine cured stock much more than the unsulfurized product. In general, the sulfur derivatives of dihydroquinolines are superior to the corresponding dihydroquinolines per se. The dihydroquinoline from aniline and acetone and polymers thereof are unsatisfactory but the sulfur derivatives are effective.

Other effective nitrogen and sulfur compounds are 2-mercaptobenzimidazole and equivalents described in U.S. Patent No. 1,933,962 to Bogemann et al. and the sulfur derivatives of the reaction product of diphenylamine and acetone (U.S. Patent No. 1,906,936 to ter Horst).

It is intended to cover all changes and modifications of the examples of the invention herein chosen for purposes of disclosure which do not constitute departures from the spirit and scope of the invention.

What is claimed is:

1. The process of compounding and vulcanizing a sulfur vulcanizable hydrocarbon rubber in the presence of 20–80 parts by weight of reinforcing furnace black per 100 parts by weight of rubber hydrocarbon wherein the stock temperature during mixing approaches or even exceeds vulcanizing temperature for short periods, which comprises incorporating into the rubber the aforesaid furnace black, a delayed action thiazole sulfenamide accelerator and, as the essential vulcanizing agent, an N,N'-dithio-bis-secondary amine in amount such that the sulfur in the dithioamine is within the range of 0.5–1.5 parts by weight sulfur per 100 parts of rubber hydrocarbon, the secondary amino radicals being selected from the group consisting of piperidyl, pipecolinyl, morpholinyl and disubstituted amino radicals in which the substituents are selected from the group consisting of alkyl of 1–8 carbon atoms, cyanoethyl, cyanomethyl, chloroethyl, phenethyl, benzyl cyclohexyl, tetrahydrofuryl, tetrahydrofurfuryl, and tetrahydrothienyl, said essential vulcanizing agent increasing processing safety as compared to vulcanizing with elemental sulfur as the sole vulcanizing agent in the presence of the sulfenamide accelerator but decreasing resistance to flex cracking and also incorporating therein as flex cracking inhibitor at least about 1% on the rubber hydrocarbon sufficient to render the resistance to flex cracking at least equal to that obtainable by vulcanization with elemental slufur a material selected from the group consisting of 6-alkoxy dihydrotrimethylquinolines, N-cyclohexyl-N'-phenyl-p-phenylenediamine, N-hexyl-N'-phenyl-p-phenyldiamine, admixture of 6-phenyl-1,2-dihydro-2,2,4-trimethylquinoline and diphenyl-p-phenylenediamine, di-p-alkoxy-phenyl-p-phenylenediamine, mercapto benzimidazole and rubber antidegradants prepared by condensing a member of the group consisting of sulfur and sulfur halides with a member of the group consisting of 6-alkoxydihydrotrimethylquinolines, diarylmonoamines, diaryl-p-phenylenediamines and reaction product of diphenylamine and acetone.

2. The process of compounding and vulcanizing a sulfur vulcanizable hydrocarbon rubber in the presence of 20–80 parts by weight of reinforcing furnace black per 100 parts by weight of rubber hydrocarbon wherein the stock temperature during mixing approaches or even exceeds vulcanizing temperature for short periods which comprises incorporating into the rubber the aforesaid furnace black, a delayed action thiazole sulfenamide accelerator and, as the essential vulcanizing agent, N,N'-dithio-bis-morpholine in amounts such that the sulfur in said dithioamine is within the range of 0.5–1.5 parts by weight sulfur per 100 parts of rubber hydrocarbon, said essential vulcanizing agent increasing processing safety as compared to vulcanizing with elemental sulfur as the sole vulcanizing agent in the presence of the sulfenamide accelerator but decreasing resistance to flex cracking and also incorporating therein as flex cracking inhibitor at least about 1% on the rubber hydrocarbon sufficient to render the resistance to flex cracking at least equal to that obtainable by vulcanizing with elemental sulfur, N-cyclohexyl-N'-phenyl-p-phenylenediamine.

3. The vulcanized product produced by the process of claim 1.

References Cited in the file of this patent

UNITED STATES PATENTS

| 2,187,155 | Ingram | Jan. 16, 1940 |
| 2,271,123 | Jones | Jan. 27, 1942 |
| 2,747,005 | Zerbe et al. | May 22, 1956 |